April 17, 1951   F. D. GRAHAM   2,548,969
ASH PAN

Filed Dec. 11, 1946   2 Sheets-Sheet 1

INVENTOR.
FREDERICK D. GRAHAM
BY
Christian D. Nielsen
ATTORNEY.

April 17, 1951     F. D. GRAHAM     2,548,969
ASH PAN
Filed Dec. 11, 1946     2 Sheets-Sheet 2
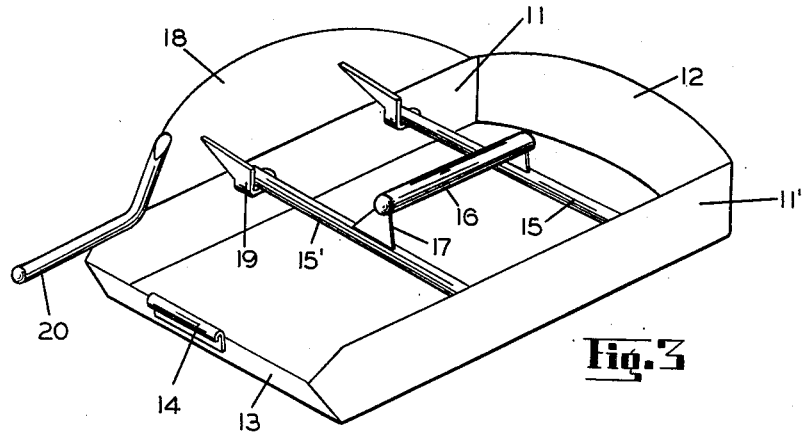
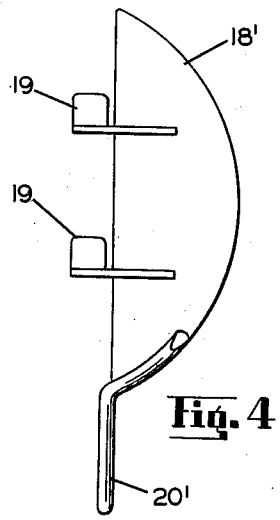
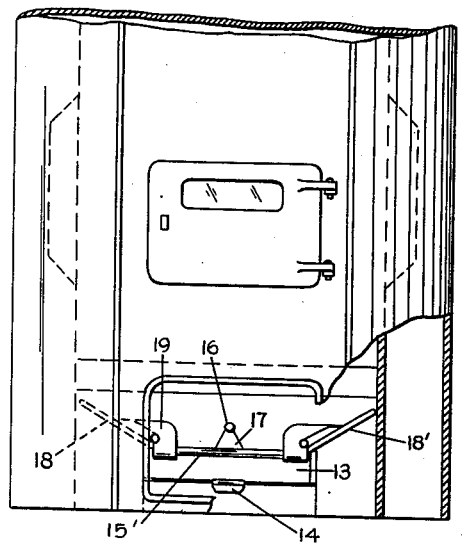
INVENTOR.
FREDERICK D. GRAHAM
BY
Christian R. Nielsen
ATTORNEY.

Patented Apr. 17, 1951

2,548,969

UNITED STATES PATENT OFFICE 2,548,969

ASH PAN

Frederick D. Graham, Milwaukee, Wis.

Application December 11, 1946, Serial No. 715,485

3 Claims. (Cl. 126—243)

My invention relates to ash pans and more particularly to an adjustable pan for use in heating furnaces or the like.

The object of my invention is to provide a pan having a receiving surface equivalent to the entire grate area of the furnace, and to have slidable adjustment of the receiving surface to facilitate removing the entire unit through the narrow ash compartment door of a furnace.

Another object of my invention is to provide a device of the character described that will permit agitation of the extending members, thereby enabling the ashes that have been deposited onto the extending members to be brought into the pan proper prior to its removal.

Still another object of my invention is to so construct the device in a manner to permit all accessories to be removed, so that the pan only as a single unit can be conveyed with ease for the disposition of the ashes within the pan.

A still further object of my invention is to construct the device in a manner that will prevent the ashes from spilling out of the front opening, yet permit the use of a shovel for removing any or all ashes if desired.

Other and further objects of my invention will become more apparent as the description proceeds and when taken in conjunction with the drawing in which Figure 1 is a top or plan view of the assembled device with the wing portions extending outward from the walls of the pan proper.

Figure 3 is a perspective view of the device with one wing in place and the other wing removed.

Figure 4 is a plan view of a single wing separate from the assembly, and

Figure 5 is a fragmentary view of the assembled device as applied to a conventional type of home heating furnace.

Figure 1:
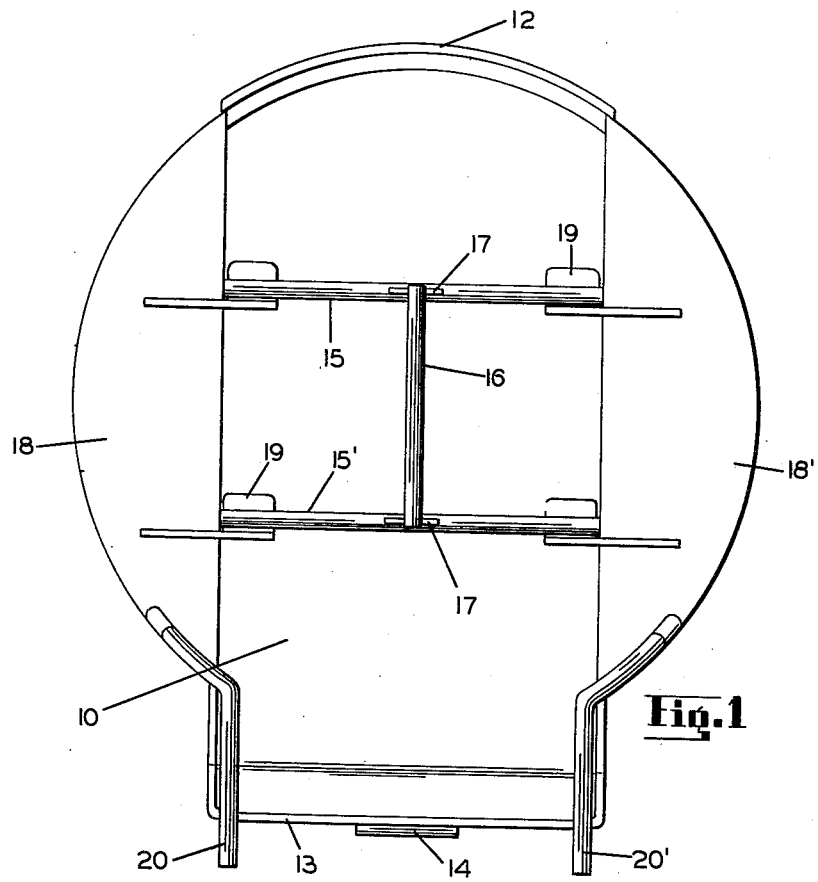

Similar characters of reference indicate corresponding parts throughout the several views and referring now to the same I show a pan structure consisting of a bottom plate 10 and two side walls 11 and 11', vertically disposed upwardly from the bottom plate 10. There is also a vertical rear wall 12 which is circumferentially formed to fit the contour of the ash pit of the furnace to which the device is applied. The front wall 13 is angularly disposed and is provided with a handle member 14 which is employed for slidably removing the pan from the ash pit of the furnace. There are cross members 15 and 15' attached to the side walls 11 and 11' of the pan proper and a cross member 16 is attached to these cross members 15 and 15' by means of brackets 17 which extend upward therefrom acting as a handle for conveying the entire pan when the ashes are to be disposed of.

Extending outward from the walls 11 and 11' of the pan structure are shown wing members 18 and 18' having circumferential contours at their outer edges. These wing members extend outward from the side walls 11 and 11' of the pan and when in an extended position extend the entire surface of the pan structure to correspond with the surface of the grate within the furnace to which it is applied.

Figure 2:
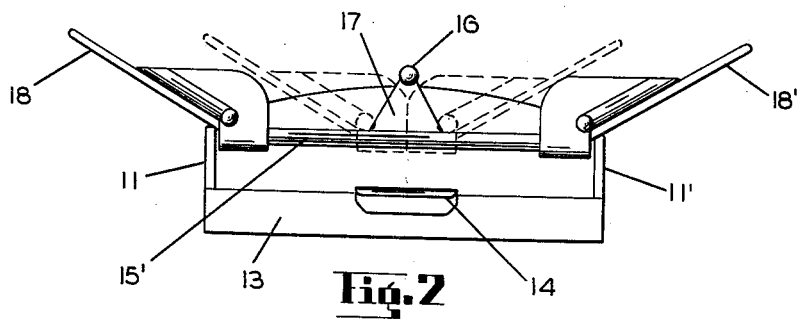
Figure 2 is a front view of the device as shown in Figure 1.

These wing members are provided with engaging members 19 which extend inwardly and below the cross members 15 and 15' in a manner to support the wing members 18 and 18' in an angular position as shown in Figure 2. This also permits the sliding of the wing members 18 and 18' inwardly toward the handle 16 on the cross members 15 and 15' thereby reducing the outer dimensions of the assembled unit and keeping it within the area taken by the pan proper. The wing members 18 and 18' are obviously of a right and left hand construction and are provided with outwardly extending arms 20 and 20' which enable the user to remove the wing members 18 and 18' from the contact with the cross members 15 and 15', or to permit the user to slide these wing members 18 and 18' inwardly towards the middle of the cross members 15 and 15', and when it becomes necessary it may also be found convenient to use these handles 20 and 20' to agitate the wing members so that any ashes that may be deposited onto the wing members can be made to fall within the structure of the pan itself.

In this manner it is possible to either move the wing members 18 and 18' inwardly towards the brackets 17 or it is possible to remove these wing members entirely one at a time prior to the removal of the pan structure, and when the pan assembly is removed from the furnace through the narrow ash pit door of the furnace the user may use the cross arm 16 as a handle to convey the entire ash pan to the place where the ashes are to be disposed of.

The device illustrated, described and claimed herein affords a complete ash pit protection, for it provides an area equivalent to the area of the grate of the furnace, and it provides a means of having the ashes falling through the grate to be deposited into the pan proper prior to removal of the pan.

It eliminates all the shoveling of the ashes out of the ash pit, but in the event that for some reason the ashes in the pit become more than would permit the entire unit to be satisfactorily removed, the slant of the front wall 13 of the pan assembly permits the use of a shovel to take the surplus ashes before the removal of the pan.

The outer wings 18 and 18' being loosely attached to this device afford a means of their removal or agitation before the removal of the pan.

In the chosen embodiment of my invention there are present many features not heretofore disclosed in the prior art. There are many advantages afforded by my device over the devices displayed in the prior art. However, I am fully cognizant of the fact that many changes in the form and configuration of the component parts may be made without in any way effecting their operativeness or efficiency, and I reserve the right to make such changes as I may deem necessary or convenient without departing from the spirit of my invention or the scope of the appended claims.

Having thus described my invention, what I claim and desire to secure by Letters Patent in the United States is:

1. A device of the character described comprising a pan open at its top, said pan consisting of a bottom plate and upwardly extending side and end walls around the outer edge of said plate, transverse cross members extending from one side wall to another, and a pair of wing members, said wing members extending outward from said side walls, an outwardly extending handle attached to each of said wing members, and engaging means mounted on said wing members for slidably engaging said wing members with said cross members.

2. A device of the character described comprising a pan open at its top, said pan consisting of a bottom plate and vertical side and end wall members around the outer edge of said plate, a pair of transverse cross members extending from one side wall member to the other, a pair of wing members circumferentially formed and extending outwardly from the walls of said pan structure, said wing members provided with mounting brackets for adjustably mounting said wing members on said cross members, and a handle extending outward and forward from each of said wing members.

3. A device of the character described comprising a furnace ash pan, said pan having an arcuate vertical rear wall, an angularly disposed front wall and two vertically disposed side walls, a pair of transverse cross members extending from one side wall to the other, a pair of wing members, said wing members being circumferentially formed at their outer edges and arranged for adjustably mounting on said cross members, said wing members extending outward from said side walls when in engagement with said cross members, a handle attached to the front of each wing member, said handles employed for moving said wing members slidably on said cross members, a handle extending from mid point on one cross member to mid point on the other, and means attached to the angularly disposed front wall for removing said pan when said wing members are slidably moved toward the middle of said cross members.

FREDERICK D. GRAHAM.

REFERENCES CITED

The following references are of record in the file of this patent:

UNITED STATES PATENTS

| Number | Name | Date |
|---|---|---|
| 307,337 | Robinson | Oct. 28, 1884 |
| 350,866 | Byers | Oct. 12, 1886 |
| 467,988 | Jenkins | Feb. 2, 1892 |
| 836,002 | Bagby | Nov. 13, 1906 |
| 1,277,751 | Prochazka | Sept. 3, 1918 |
| 1,627,023 | Farrar | May 3, 1927 |
| 1,655,282 | Middour | Jan. 3, 1928 |
| 1,706,803 | Middour | Mar. 26, 1929 |
| 1,793,376 | Schantz | Feb. 17, 1931 |
| 1,869,234 | App | July 26, 1932 |
| 1,957,379 | App | May 1, 1934 |